US012380136B2

(12) United States Patent
Puranam Hosudurg et al.

(10) Patent No.: US 12,380,136 B2
(45) Date of Patent: Aug. 5, 2025

(54) METHOD AND SYSTEM FOR IDENTIFYING LABELS OF UNLABELLED COLUMN DATA

(71) Applicant: Tata Consultancy Services Limited, Mumbai (IN)

(72) Inventors: Anantha Desik Puranam Hosudurg, Hyderabad (IN); Sumiran Naman, Pune (IN); Ashim Roy, Pune (IN); Ashish Diwan, Pune (IN); Nikhil Girish Patwardhan, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/762,096

(22) Filed: Jul. 2, 2024

(65) Prior Publication Data
US 2025/0061134 A1    Feb. 20, 2025

(30) Foreign Application Priority Data
Aug. 16, 2023 (IN) .............................. 202321054856

(51) Int. Cl.
*G06F 16/00* (2019.01)
*G06F 16/22* (2019.01)
*G06F 16/28* (2019.01)

(52) U.S. Cl.
CPC .......... *G06F 16/285* (2019.01); *G06F 16/221* (2019.01)

(58) Field of Classification Search
None
See application file for complete search history.

(56) References Cited

U.S. PATENT DOCUMENTS

| | | | |
|---|---|---|---|
| 11,048,979 B1 | 6/2021 | Zhdanov et al. | |
| 11,544,471 B2* | 1/2023 | Belém | G06Q 40/02 |
| 11,556,825 B2 | 1/2023 | Giovannini et al. | |
| 2003/0236578 A1* | 12/2003 | Gammerman | G06F 18/21 700/47 |
| 2022/0058440 A1 | 2/2022 | Feng et al. | |
| 2022/0092354 A1 | 3/2022 | Kunde et al. | |
| 2022/0114490 A1* | 4/2022 | Das | G06N 3/088 |
| 2023/0133410 A1* | 5/2023 | Moreira | G06N 5/01 706/25 |
| 2023/0244987 A1* | 8/2023 | Truong | G06N 20/00 706/11 |

(Continued)

*Primary Examiner* — Anhtai V Tran
(74) *Attorney, Agent, or Firm* — FINNEGAN, HENDERSON, FARABOW, GARRETT & DUNNER LLP

(57) ABSTRACT

As discussed earlier, labelling techniques that are available for labelling of unlabelled tabular data use some semi supervised models for identification purposes. However, they require sample labeled data for training purposes. Further, the same labelling model/technique cannot be used for all data types. Present disclosure provides method and system for identifying labels of unlabeled column data. The system uses a hybrid approach i.e., it uses language models, regular expressions and known dictionaries for labelling of unlabelled tabular data. For performing labelling, system first classifies received unlabelled tabular data into one or more data buckets. The system then uses appropriate techniques, based on data types, for identification of labels of unlabeled data present in data buckets. Thereafter, system uses feedback mechanism which will impart maturity to system over time. Finally, once system is matured, system can identify labels for all types of data.

18 Claims, 7 Drawing Sheets

(56) References Cited

U.S. PATENT DOCUMENTS

| | | | |
|---|---|---|---|
| 2023/0267175 A1* | 8/2023 | Jain | G06F 18/22 |
| | | | 706/15 |
| 2024/0354638 A1* | 10/2024 | Wang | G06N 3/045 |

* cited by examiner

METHOD AND SYSTEM FOR IDENTIFYING LABELS OF UNLABELLED COLUMN DATA

PRIORITY CLAIM

This U.S. patent application claims priority under 35 U.S.C. § 119 to: Indian Patent Application No. 202321054856, filed on Aug. 16, 2023. The entire contents of the aforementioned application are incorporated herein by reference.

TECHNICAL FIELD

The disclosure herein generally relates to data labelling, and, more particularly, to a method and a system for identifying labels of unlabelled column data.

BACKGROUND

Nowadays, almost every industry is trying to adopt artificial intelligence (AI)/Machine learning (ML) in one way or other for automating their business processes. The AI/ML algorithms generally require data for training purposes. The quality of the data that an AI/ML algorithm is trained on is directly proportional to success of the algorithm. So, the quality of the data, in particular, the labelling of the training data plays a huge role in ensuring that the system is learning the exact same thing that it is supposed to.

However, one of the most critical problem faced by the industries today is the unavailability of the correctly labelled data. In particular, most of the tabular data that is available for training purposes is without column information. Sometimes, the provided labelled data may include some in discrepancies in terms of labels assigned i.e., there will be no surety that the assigned labels are representing the correct column data patterns or not.

Some of the labelling techniques that are available for labelling unlabelled tabular data uses some semi supervised models for identifying labels. However, they require sample labeled data for training purposes. Further, if the sample training data labels is erroneous, then it hampers the overall training of the system. Additionally, the same labelling model/technique cannot be used for all data types.

Further, few labelling models/techniques can find the named entities for maximum of sixteen types of data. They cannot address data types, such as text, regex and numerical at the same time.

SUMMARY

Embodiments of the present disclosure present technological improvements as solutions to one or more of the above-mentioned technical problems recognized by the inventors in conventional systems. For example, in one aspect, there is provided a method for identifying labels of unlabelled column data. The method comprises receiving, by a labelling system via one or more hardware processors, a document comprising unlabelled tabular data and data segregation details, wherein the unlabelled tabular data comprises a plurality of unlabelled entries, and wherein the segregation details comprises one or more of a batch size and a number of batches to be created; performing, by the labelling system via the one or more hardware processors, sampling of the unlabelled tabular data to obtain one or more data samples based on the batch size and the number of batches to be created using a stratified sampling technique, wherein each data sample of the one or more data samples comprises one or more unlabelled entries of the plurality of unlabelled entries; performing, for each data sample of the one or more data samples: pre-processing, by the labelling system via the one or more hardware processors, the one or more unlabelled entries present in the data sample to obtain one or more pre-processed unlabelled entries, using one or more pre-processing techniques, wherein the one or more pre-processing techniques comprise a null value analysis, a unique value analysis, and a data type analysis, wherein each pre-processed unlabelled entry comprises a bucket information of a respective unlabelled entry, wherein the bucket information comprises details of an assigned data bucket among one or more data buckets, and wherein the one or more data buckets comprises a text bucket, a numerical bucket and a miscellaneous bucket; performing, by the labelling system via the one or more hardware processors, bucketing of each pre-processed unlabelled entry of the one or more pre-processed unlabelled entries present in each data sample based on the bucket information of a respective pre-processed unlabelled entry; identifying, by the labelling system via the one or more hardware processors, a process among one or more processes to be performed on each data bucket of the one or more data buckets, based on a bucket metadata of a respective data bucket using a label selector, wherein the bucket metadata is accessed from a database; performing, by the labelling system via the one or more hardware processors, a named entity identification for each pre-processed unlabelled entry present in each data bucket to obtain a primary label for the respective pre-processed unlabelled entry using the process identified for the respective data bucket; performing, by the labelling system via the one or more hardware processors, a final label identification for each pre-processed unlabelled entry present in each data bucket based on the primary label identified for the respective pre-processed unlabelled entry using a heuristic handler, wherein the heuristic handler uses one or more knowledge dictionaries and the primary label to identify a final label for each pre-processed unlabelled present in each data bucket; generating, by the labelling system via the one or more hardware processors, a prediction summary based on the final label identified for each pre-processed unlabelled present in each data bucket, wherein the prediction summary comprises label details of each unlabelled entry present in the unlabelled tabular data and a prediction score; comparing, by the labelling system via the one or more hardware processors, the prediction score with a predefined plateau threshold score; and preparing, by the labelling system via the one or more hardware processors, an aggregated prediction report based on the comparison, wherein the aggregated prediction report comprises a final label for each unlabelled entry present in the unlabelled tabular data present in the received document.

In an embodiment, the one or more processes comprises an artificial intelligence (AI) model handling process, a numeric handling process and a miscellaneous event handling process.

In an embodiment, the AI model handling process uses one or more models for performing the named entity identification of the one or more pre-processed unlabelled entries present in the text bucket, and wherein the one or more models comprises a large language model (LLM), a pattern identification model and a domain specific model.

In an embodiment, the numeric handling process uses a numerical ontology model for performing the named entity identification of the one or more pre-processed unlabelled entries present in the numerical bucket, and wherein the numerical bucket comprises the one or more pre-processed unlabelled entries whose data type is defined as numerical.

In an embodiment, the miscellaneous event handling process uses one or more miscellaneous knowledge dictionaries for performing the named entity identification of the one or more pre-processed unlabelled entries present in the miscellaneous bucket, and wherein the miscellaneous bucket comprises the one or more pre-processed unlabelled entries whose data type is defined as miscellaneous.

In an embodiment, the method comprises: once the plurality of unlabelled entries are categorized into the one or more data buckets, creating, by the labelling system via the one or more hardware processors, the bucket metadata for each data bucket based on the pre-processing, wherein the bucket metadata comprises one or more data types, one or more unique values, one or more distinct values and null percentage; and storing, by the labelling system via the one or more hardware processors, the bucket metadata for each data bucket into the database.

In another aspect, there is provided a labelling system for identifying labels of unlabelled column data. The system comprises a memory storing instructions; one or more communication interfaces; and one or more hardware processors coupled to the memory via the one or more communication interfaces, wherein the one or more hardware processors are configured by the instructions to: receive a document comprising unlabelled tabular data and data segregation details, wherein the unlabelled tabular data comprises a plurality of unlabelled entries, and wherein the segregation details comprises one or more of a batch size and a number of batches to be created; perform sampling of the unlabelled tabular data to obtain one or more data samples based on the batch size and the number of batches to be created using a stratified sampling technique, wherein each data sample of the one or more data samples comprises one or more unlabelled entries of the plurality of unlabelled entries; perform for each data sample of the one or more data samples: pre-processing, by the labelling system via the one or more hardware processors, the one or more unlabelled entries present in the data sample to obtain one or more pre-processed unlabelled entries, using one or more pre-processing techniques, wherein the one or more pre-processing techniques comprise a null value analysis, a unique value analysis, and a data type analysis, wherein each pre-processed unlabelled entry comprises a bucket information of a respective unlabelled entry, wherein the bucket information comprises details of an assigned data bucket among one or more data buckets, and wherein the one or more data buckets comprises a text bucket, a numerical bucket and a miscellaneous bucket; perform bucketing of each pre-processed unlabelled entry of the one or more pre-processed unlabelled entries present in each data sample based on the bucket information of a respective pre-processed unlabelled entry; identify a process among one or more processes to be performed on each data bucket of the one or more data buckets, based on a bucket metadata of a respective data bucket using a label selector, wherein the bucket metadata is accessed from a database; perform a named entity identification for each pre-processed unlabelled entry present in each data bucket to obtain a primary label for the respective pre-processed unlabelled entry using the process identified for the respective data bucket; perform a final label identification for each pre-processed unlabelled entry present in each data bucket based on the primary label identified for the respective pre-processed unlabelled entry using a heuristic handler, wherein the heuristic handler uses one or more knowledge dictionaries and the primary label to identify a final label for each pre-processed unlabelled present in each data bucket; generate a prediction summary based on the final label identified for each pre-processed unlabelled present in each data bucket, wherein the prediction summary comprises label details of each unlabelled entry present in the unlabelled tabular data and a prediction score; compare the prediction score with a predefined plateau threshold score; and prepare an aggregated prediction report based on the comparison, wherein the aggregated prediction report comprises a final label for each unlabelled entry present in the unlabelled tabular data present in the received document.

In yet another aspect, there are provided one or more non-transitory machine-readable information storage mediums comprising one or more instructions which when executed by one or more hardware processors cause identification of labels of unlabelled column data by receiving, by a labelling system, a document comprising unlabelled tabular data and data segregation details, wherein the unlabelled tabular data comprises a plurality of unlabelled entries, and wherein the segregation details comprises one or more of a batch size and a number of batches to be created; performing, by the labelling system, sampling of the unlabelled tabular data to obtain one or more data samples based on the batch size and the number of batches to be created using a stratified sampling technique, wherein each data sample of the one or more data samples comprises one or more unlabelled entries of the plurality of unlabelled entries; for each data sample of the one or more data samples, performing: pre-processing, by the labelling system, the one or more unlabelled entries present in the data sample to obtain one or more pre-processed unlabelled entries, using one or more pre-processing techniques, wherein the one or more pre-processing techniques comprise a null value analysis, a unique value analysis, and a data type analysis, wherein each pre-processed unlabelled entry comprises a bucket information of a respective unlabelled entry, wherein the bucket information comprises details of an assigned data bucket among one or more data buckets, and wherein the one or more data buckets comprises a text bucket, a numerical bucket and a miscellaneous bucket; performing, by the labelling system, bucketing of each pre-processed unlabelled entry of the one or more pre-processed unlabelled entries present in each data sample based on the bucket information of a respective pre-processed unlabelled entry; identifying, by the labelling system, a process among one or more processes to be performed on each data bucket of the one or more data buckets, based on a bucket metadata of a respective data bucket using a label selector, wherein the bucket metadata is accessed from a database; performing, by the labelling system, a named entity identification for each pre-processed unlabelled entry present in each data bucket to obtain a primary label for the respective pre-processed unlabelled entry using the process identified for the respective data bucket; performing, by the labelling system, a final label identification for each pre-processed unlabelled entry present in each data bucket based on the primary label identified for the respective pre-processed unlabelled entry using a heuristic handler, wherein the heuristic handler uses one or more knowledge dictionaries and the primary label to identify a final label for each pre-processed unlabelled present in each data bucket; generating, by the labelling system, a prediction summary based on the final label identified for each pre-processed unlabelled present in each data bucket, wherein the prediction summary comprises label details of each unlabelled entry present in the unlabelled tabular data and a prediction score; comparing, by the labelling system, the prediction score with a predefined plateau threshold score; and preparing, by the labelling system, an aggregated prediction report based on the comparison, wherein the aggregated prediction report comprises a final label for each unlabelled entry present in the unlabelled tabular data present in the received document.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
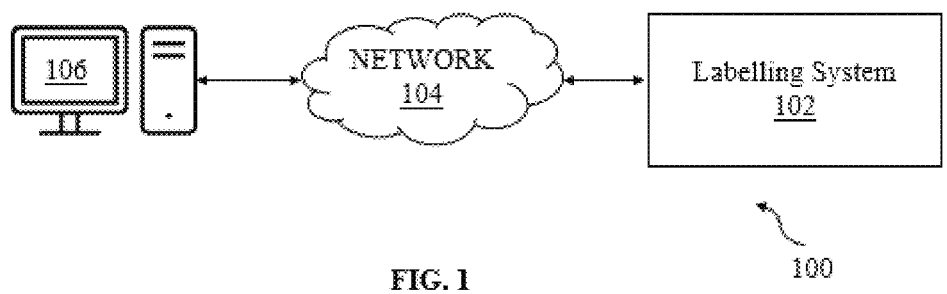
FIG. 1 is an example representation of an environment, related to at least some example embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Availability of data without columns in large transformation is an old age industry problem. Sometimes, data may have labels but there will be no guarantee that the labels are addressing the correct columns.

As discussed earlier, some existing approaches have used some semi supervised models that were found to be very successful in identifying labels for unlabelled data. However, they require large amount of sample label data for training of the semi supervised models. Further, if sample training data labels is having some issues, then it reflects on the overall data which ultimately results in inaccuracy in training as well as in the classification.

Few available techniques attempted to label the data based on clusters and label propagation. However, the accuracy observed is very low thereby making them non-usable for industry purposes. Additionally, the available techniques does not perform well on cross domain and numerical data types. Thus, there is a need for a system that can identify the named entities, such as text, regex and numerical without requiring a lot of training.

Embodiments of the present disclosure overcome the above-mentioned disadvantages by providing a method and a system for identifying labels of unlabelled column data. The system of the present disclosure uses a hybrid approach i.e., it uses one or more language models, regular expressions (Regex) and some predefined known dictionaries for labelling of received unlabelled tabular data. For performing labelling of the unlabelled tabular data, the system first classifies the received unlabelled tabular data into one or more data buckets. The system then uses the appropriate techniques, based on the data types, for labelling of the one or more data buckets. Thereafter, the system uses a feedback mechanism which will impart maturity to the system over time. Finally, once the system is matured, the system can identify labels for all types of data.

In the present disclosure, the system and the method uses intelligent bucketing techniques, thereby ensuring accurate representation of all the sampled data. The system predicts the primary labels for each bucket based on the metadata using AI model and then uses the heuristic handler that further refines the labels based on domain relevant information, thus ensuring improved accuracy of the predicted labels as both AI and domain knowledge is used to come up with the final labels. Further, for each iteration, the system provides real-time monitoring of predicted labels with confidence level scores and also intelligently controls the iteration using the plateau checker. Additionally, the system provides an option of providing feedback that may help in continuously enriching the model knowledge in operational domain which may further incrementally increase the prediction accuracy and thus ensuring the increased model maturity.

Referring now to the drawings, and more particularly to FIGS. 1 through 5B, where similar reference characters denote corresponding features consistently throughout the figures, there are shown preferred embodiments and these embodiments are described in the context of the following exemplary system and/or method.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, performing sampling and bucketing, performing named entity identification, generating prediction summary, etc. The environment 100 generally includes a labelling system 102, and an electronic device 106 (hereinafter also referred as a user device 106), each coupled to, and in communication with (and/or with access to) a network 104. It should be noted that one user device is shown for the sake of explanation; there can be more number of user devices.

The network 104 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof.

Various entities in the environment 100 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The user device 106 is associated with a user (e.g., an administrator of the labelling system 102) or an organization responsible for managing the labelling system 102. Examples of the user device 106 include, but are not limited to, a personal computer (PC), a mobile phone, a tablet device, a Personal Digital Assistant (PDA), a server, a voice activated assistant, a smartphone, and a laptop.

The labelling system 102 includes one or more hardware processors 204 and a memory. The labelling system 102 is first configured to receive a document comprising unlabelled tabular data and data segregation details via the network 104 from the user device 106. The labelling system 102 then performs sampling of the unlabelled tabular data using a stratified sampling technique. Once one or more data samples are available, the labelling system 102 performs pre-processing of one or more unlabelled entries present in each data sample. Thereafter, the labelling system 102 profiles data present in each data sample, and data bucket and bucket metadata is created for each data sample based on a column profile of the respective data sample. Further, the labelling system 102 uses a label selector to select a best method for each data bucket, wherein the selected method performs named entity identification for the respective bucket. In particular, a primary label is identified for each unlabelled entry present in the respective bucket.

Once the primary labels are available, the labelling system 102 uses a heuristic handler for identifying final label for each pre-processed unlabelled entry present in each data bucket. Thereafter, a prediction summary is generated by the labelling system 102 based on the final label identified for each pre-processed unlabelled present in each data bucket. The prediction summary includes label details of each unlabelled entry present in the unlabelled tabular data and a prediction score. Finally, the labelling system 102 compares the prediction score with a predefined plateau threshold score. If the prediction score is more than or equivalent to the predefined plateau threshold score, then plateau is considered as satisfied and an aggregated prediction report is prepared, and the process ends. If plateau did not satisfy, the process moves to the next iteration and the labelling system 102 may again perform profiling of unlabeled tabular data. The process of identifying labels is explained in detail with reference to FIGS. 3 and 4A-4C.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100 (e.g., refer scenarios described above).

Figure 2:
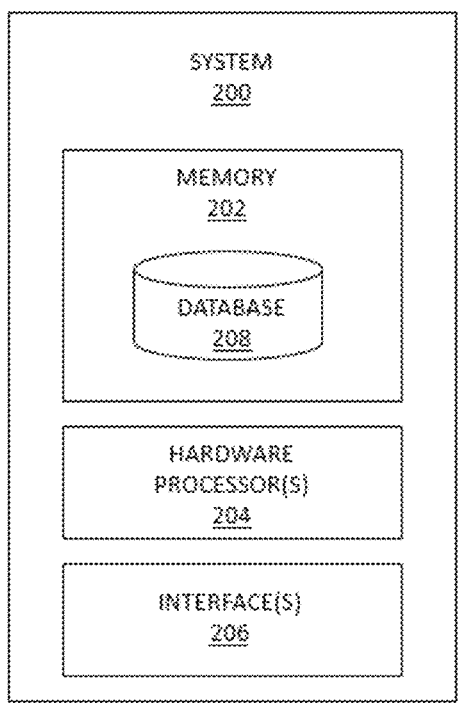
FIG. 2 illustrates an exemplary block diagram of a labelling system for identifying labels of unlabelled column data, in accordance with an embodiment of the present disclosure.

FIG. 2 illustrates an exemplary block diagram of the labelling system 102 for identifying labels of unlabelled column data, in accordance with an embodiment of the present disclosure. In some embodiments, the labelling system may also be referred as system 102 and may be interchangeably used herein. In some embodiments, the system 102 is embodied as a cloud-based and/or SaaS-based (software as a service) architecture. In some embodiments, the system 102 may be implemented in a server system. In some embodiments, the system 102 may be implemented in a variety of computing systems, such as laptop computers, notebooks, hand-held devices, workstations, mainframe computers, and the like.

In an embodiment, the system 102 includes one or more processors 204, communication interface device(s) or input/output (I/O) interface(s) 206, and one or more data storage devices or memory 202 operatively coupled to the one or more processors 204. The one or more processors 204 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 102 can be implemented in a variety of computing systems, such as laptop computers, notebooks, hand-held devices, workstations, mainframe computers, servers, a network cloud and the like.

The I/O interface device(s) 206 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 208 can be stored in the memory 202, wherein the database 208 may comprise, but are not limited to, bucket metadata associated with each data bucket, a predefined plateau threshold score, aggregated prediction reports, one or more processes and the like. The memory 202 further comprises (or may further comprise) information pertaining to input(s)/output(s) of each step performed by the systems and methods of the present disclosure. In other words, input(s) fed at each step and output(s) generated at each step are comprised in the memory 202 and can be utilized in further processing and analysis.

It is noted that the system 102 as illustrated and hereinafter described is merely illustrative of an apparatus that could benefit from embodiments of the present disclosure and, therefore, should not be taken to limit the scope of the present disclosure. It is noted that the system 102 may include fewer or more components than those depicted in FIG. 2.

Figure 3:
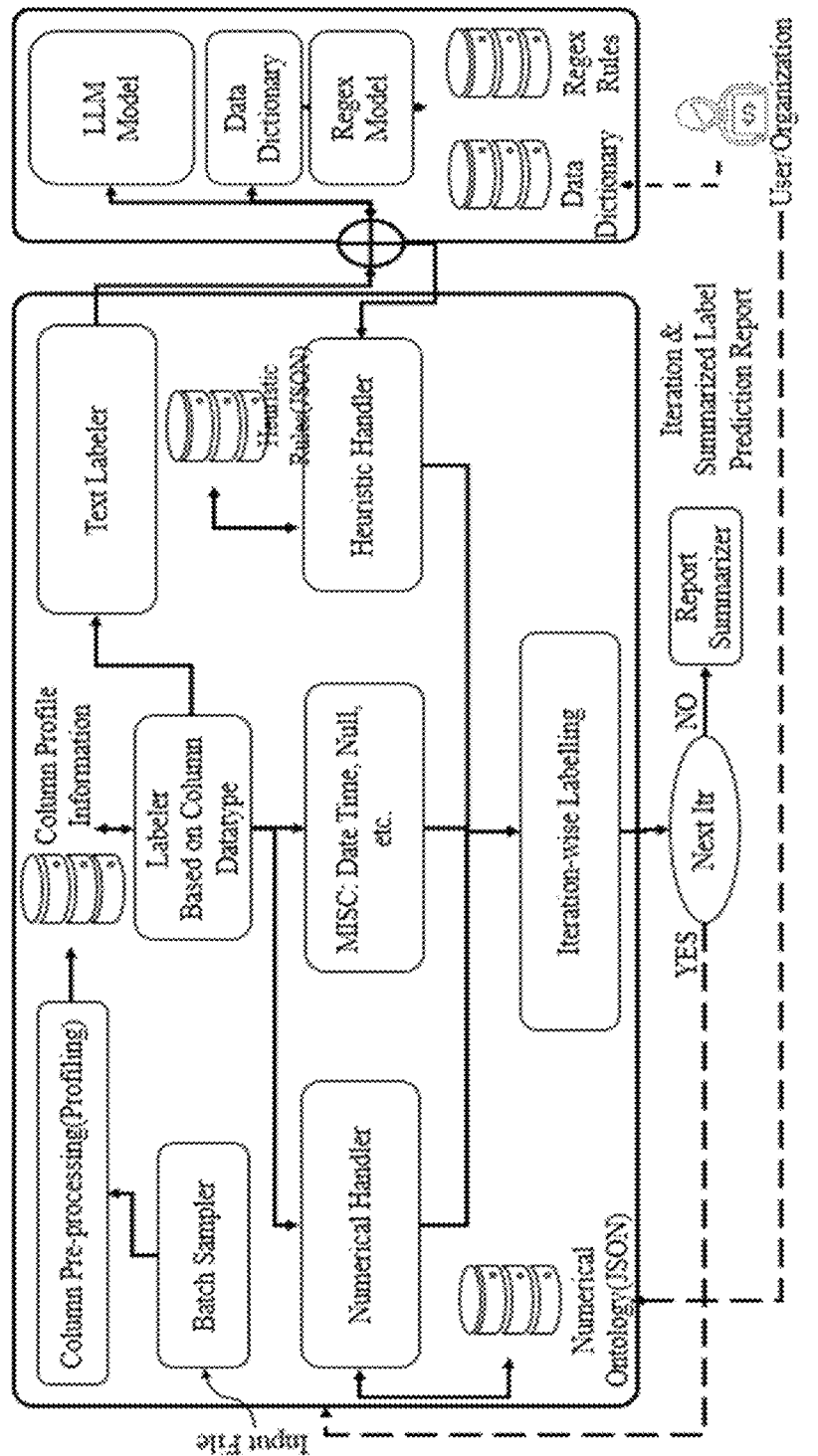
FIG. 3 illustrates a schematic block diagram representation of the labelling system of FIGS. 2 and 1 for identifying labels of the unlabelled column data, in accordance with an embodiment of the present disclosure.

FIG. 3, with reference to FIGS. 1-2, illustrates a schematic block diagram representation of the labelling system 102 of FIGS. 2 and 1 for identifying labels of the unlabelled column data, in accordance with an embodiment of the present disclosure.

As seen in FIG. 3, a batch sampler present in the labelling system 102 receives an input file or a document from a user device, such as the user device 106. The input file/document includes unlabelled tabular data and data segregation details, The batch sampler, based on the data segregation details, such as batch size and number of batches received from a user, performs sampling of the unlabelled tabular data to obtain one or more data samples. In an embodiment, the batch sampler uses the stratified sampling technique to randomize the received tabular data which is then divided into batches so that a right mixture of the unlabelled data is captured in each data sample of one or more data samples. The data present in each data batch is the profiled/preprocessed using pre-processing techniques such as a null value analysis, a unique value analysis, and a data type analysis at a column pre-processing step.

Thereafter, based on a column profile information, data buckets of unlabelled entries present in each data sample and bucket metadata are created. It should be noted that the data buckets are of three types i.e., text bucket, numerical bucket and miscellaneous bucket which are created based on unlabelled tabular data. The bucket metadata stores profile information of a respective bucket such as one or more data types, one or more unique values, one or more distinct values, null percentage, etc.

Once the data buckets are created, the data buckets and metadata will be moved to next level of processing performed by a label selector. In particular, the label selector will move the bucketed data, based on its bucket metadata, to different process methods namely artificial intelligence (AI) model handling process, a numeric handling process and a miscellaneous event handling process simultaneously. It should be noted that the label selector also checks data redundancy (i.e., high unique values) of the unlabeled data present in each data bucket, and only sends the irredundant data to a next level handler. In an embodiment, the next level handler for the text bucket is an AI model handler which performs the AI model handling process. Similarly, the next level handler for the numerical bucket is a numerical handler which performs the numeric handling process and for the miscellaneous bucket is a miscellaneous handler which performs the miscellaneous event handling process.

In at least one example embodiment, the AI model handler is a pipeline model consisting of Large Language Model (LLM), pattern identification model and domain specific models. The LLM model may have its own defined knowledge dictionary (KD) apart from defined sixteen named entities. The pattern identification models may include regex-based dictionaries that may use some existing libraries (such as libraries that has been matured with its own knowledge dictionary) to identify named entities. The domain specific models may check and identify the domain specific named entities defined in the respective KD. In an embodiment, the AI model handler may use a collision handler to avoid collision of named entities i.e., when two primary labels are predicted for same unlabelled entry, then the collision handler may select the best primary label for that specific unlabelled entry.

In an embodiment, the numerical handler uses numerical ontology KD for identifying appropriate named entities i.e., primary labels for numerical column data. The miscellaneous handler (also referred as MISC handler) identifies the primary labels for miscellaneous data types, such as null, date, time, timestamps, uniform resource locators (URLs), etc. which are defined in the KDs of the miscellaneous handler.

Once the primary label identification is done by the next level handlers, the primary label information may be shared with a heuristic handler to identify next level intelligent labels i.e., a final label. In an embodiment, the heuristic handler uses a defined KD for identifying the final label for each unlabelled entry. In particular, the heuristic handler identifies a label that is more closer to the actual data.

Thereafter, a prediction summary consolidating all the predictions including MISC handler predictions is generated. The prediction summary is then passed to a plateau checker which compares a prediction score (present in the prediction summary) with a predefined plateau threshold score. In particular, the plateau checker tries to detect plateau in the prediction of successive iterations or based on the user tolerance for each iteration. If the plateau is satisfied then the aggregated prediction report is prepared, and the process ends. If plateau did not satisfy, the process moves to a next iteration and will be continued from the profiling stage.

It should be noted that the KD's for each method may have a feedback mechanism for updating. The KD's at each prediction iteration may be automatically trained for the next iteration. The process is iteratively executed for the given batch size and once all the batch samples are exhausted, a final aggregated prediction report is created by a report summarizer. The final aggregated prediction report may include data labels for the unlabeled column data which may further help in defining the business labels with minimum intelligence. The final aggregated prediction report may also include results of all prediction iterations performed by the system 102 i.e., it includes all the aggregated prediction reports prepared for the unlabeled column data. In an embodiment, the final aggregated prediction report is displayed on a user device, such as the user device 106. In at least one example embodiment, the final aggregated report is stored in the database 208.

Figure 4A:
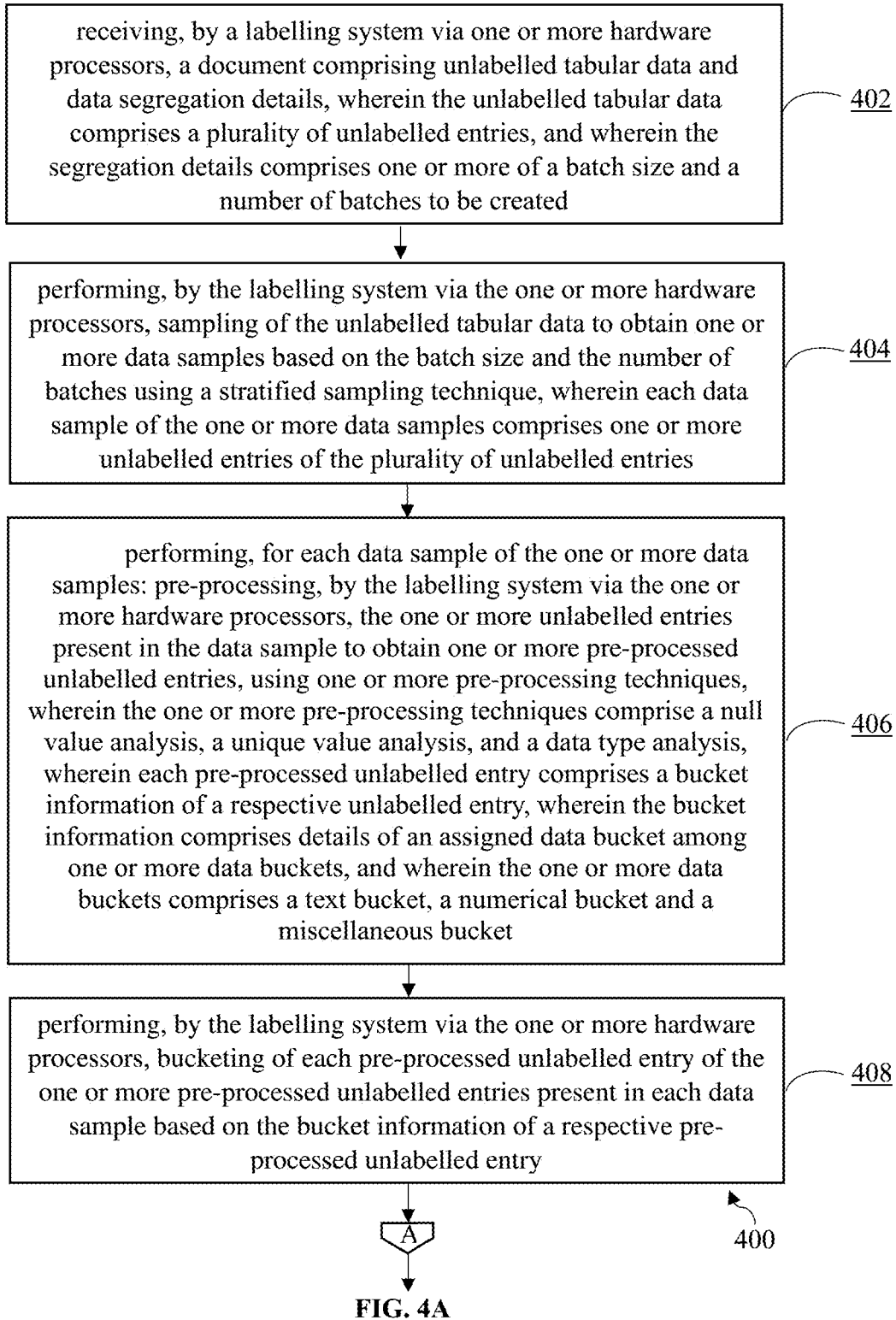
FIGS. 4A, 4B and 4C, collectively, represent an exemplary flow diagram of a method for identifying labels of the unlabelled column data, in accordance with an embodiment of the present disclosure.
Figure 4B:
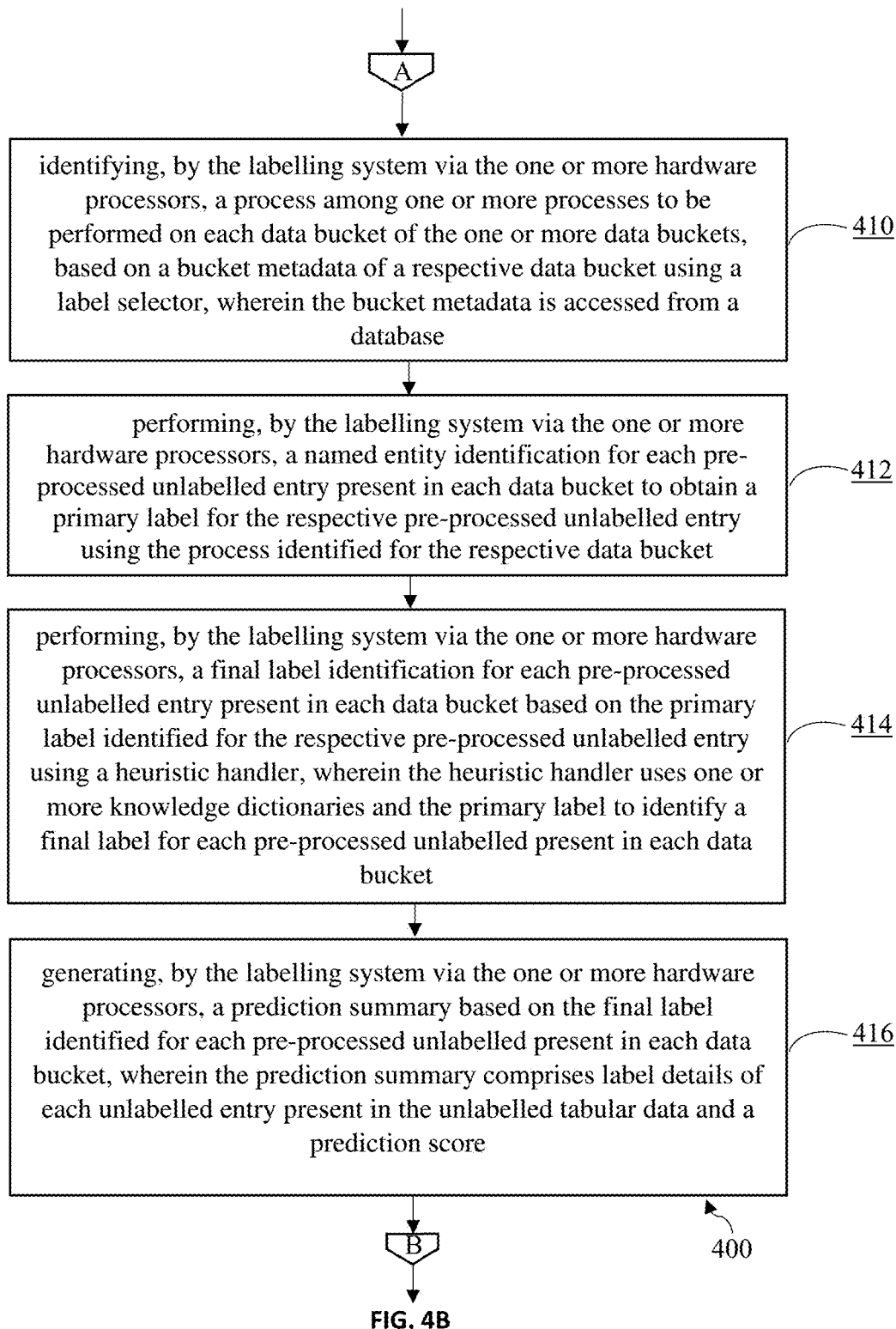
Figure 4C:
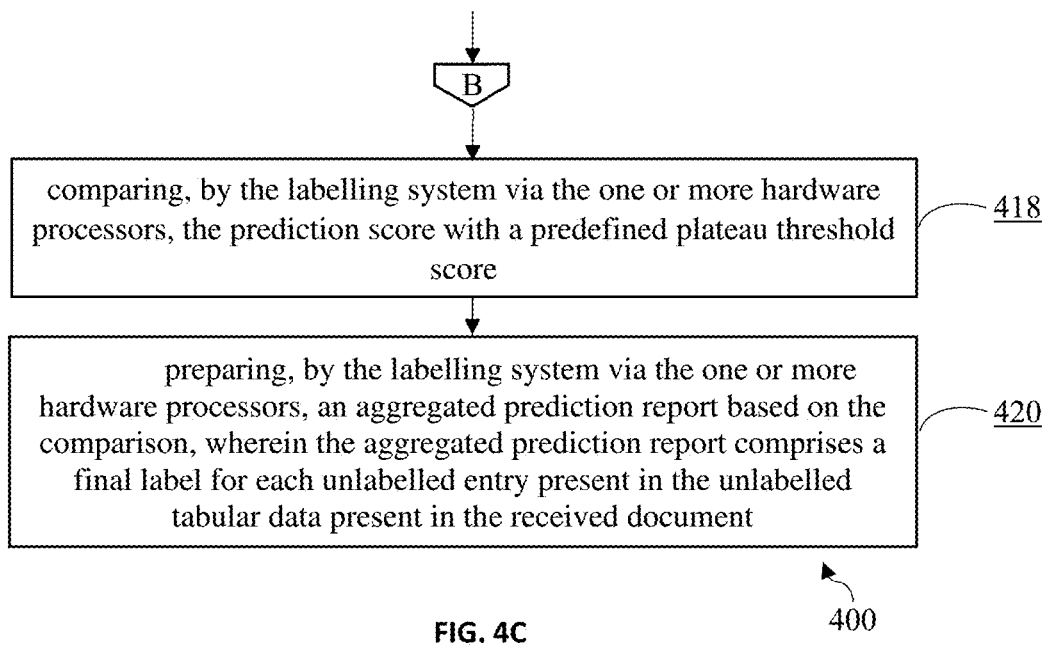

FIGS. 4A, 4B and 4C, with reference to FIGS. 1 to 3, collectively, represent an exemplary flow diagram of a method 400 for identifying labels of the unlabelled column data, in accordance with an embodiment of the present disclosure. The method 400 may use the system 102 of FIGS. 1 and 2 for execution. In an embodiment, the system 102 comprises one or more data storage devices or the memory 202 operatively coupled to the one or more hardware processors 204 and is configured to store instructions for execution of steps of the method 400 by the one or more hardware processors 204. The sequence of steps of the flow diagram may not be necessarily executed in the same order as they are presented. Further, one or more steps may be grouped together and performed in form of a single step, or one step may have several sub-steps that may be performed in parallel or in sequential manner. The steps of the method of the present disclosure will now be explained with reference to the components of the system 102 as depicted in FIG. 2 and FIG. 1.

At step 402 of the present disclosure, the one or more hardware processors 204 of the system 102 receive a document comprising unlabelled tabular data and data segregation details. In an embodiment, the document may be shared by a user of the user device 106 via the network 104. The unlabelled tabular data comprises a plurality of unlabelled entries. The segregation details comprises one or more of a batch size and a number of batches to be created for the unlabelled tabular data.

At step 404 of the present disclosure, the one or more hardware processors 204 of the system 102 perform sampling of the unlabelled tabular data to obtain one or more data samples based on the batch size and the number of batches using a stratified sampling technique. In particular, based on the data segregation details i.e., the batch size and the number of batches, the unlabelled tabular data is segregated into one or more data samples using the stratified sampling technique. In an embodiment, the stratified sampling technique can be any sampling technique known in the art. Examples of the stratified sampling technique includes, but are not limited to, randomization, block randomization, covariate adaptive randomization and the like. In at least one example embodiment, the stratified sampling technique may first randomize the plurality of unlabelled entries present in the unlabelled tabular data so that a right mixture of unlabelled entries is present in each data samples of the one or more data samples. So, after segregation, each data sample of the one or more data samples comprises one or more unlabelled entries of the plurality of unlabelled entries.

At step 406 of the present disclosure, the one or more hardware processors 204 of the system 102 perform, for each data sample of the one or more data samples, preprocessing of the one or more unlabelled entries present in a respective data sample to obtain one or more pre-processed unlabelled entries, respectively, using one or more pre-processing techniques. In an embodiment, the one or more pre-processing techniques include, but are not limited to, a null value analysis, a unique value analysis, and a data type analysis. It should be noted that each pre-processed unlabelled entry comprises a bucket information of a respective unlabelled entry. The bucket information include details of an assigned data bucket among one or more data buckets, such as a text bucket, a numerical bucket and a miscellaneous bucket.

In particular, each unlabelled entry present in each data sample is profiled based on the one or more pre-processing techniques so that the bucket information can be collected for the same unlabelled entry. The collected bucket information is then mentioned along with the same unlabelled entry which is then referred as pre-processed unlabelled entry.

At step 408 of the present disclosure, the one or more hardware processors 204 of the system 102 perform bucketing of each pre-processed unlabelled entry of the one or more pre-processed unlabelled entries present in each data sample based on the bucket information of a respective pre-processed unlabelled entry. In simpler words, each pre-processed unlabelled entry is put into a data bucket which is mentioned in the bucket information of the same pre-processed unlabelled entry. For example, the bucket information of a pre-processed unlabelled entry mentions the data bucket as numerical, then the pre-processed unlabelled entry will be put into the numerical bucket.

In an embodiment, once the plurality of unlabelled entries are categorized into the one or more data buckets, the one or more hardware processors 204 of the system 102 create a bucket metadata for each data bucket based on the preprocessing performed at the step 406. The bucket metadata comprises one or more data types, one or more unique values, one or more distinct values and null percentage. The bucket metadata for each data bucket is then stored into the database 208.

At step 410 of the present disclosure, the one or more hardware processors 204 of the system 102 identify a process among one or more processes to be performed on each data bucket of the one or more data buckets based on the bucket metadata of a respective data bucket using a label selector. The one or more processes comprises an artificial intelligence (AI) model handling process, a numeric handling process and a miscellaneous event handling process.

In particular, the label selector selects a best process to be applied on each data bucket based on its bucket metadata. For example, in case of the text bucket, the label selector may select the AI model handling process as bucket metadata of the text bucket mentions the data type as 'text'.

In one embodiment, the label selector also performs optimization of the input bucketed data present in each data bucket. In particular, the label selector first checks redundancy of data present in each data bucket and then discards the redundant data present in each data bucket hence optimize the input bucketed data present in each data bucket. This optimization helps in reducing the overall time taken by the system 102 in identification of labels of unlabelled column data.

At step 412 of the present disclosure, the one or more hardware processors 204 of the system 102 perform named entity identification for each pre-processed unlabelled entry present in each data bucket to obtain a primary label for the respective pre-processed unlabelled entry using the process identified for the respective data bucket. In simpler words, a process selected for each data bucket is applied on each unlabelled entry present in that respective data bucket to obtain the primary label for the same unlabelled entry.

In an embodiment, the AI handling process, once applied on the text bucket, uses one or more models for performing the named entity identification of the one or more pre-processed unlabelled entries present in the text bucket. The one or more models that are used include a large language model (LLM), a pattern identification model and a domain specific model.

In an embodiment, the numeric handling process, once applied on the numerical bucket, uses a numerical ontology model for performing the named entity identification of the one or more pre-processed unlabelled entries present in the numerical bucket. The numerical bucket includes the one or more pre-processed unlabelled entries whose data type is defined as numerical.

In an embodiment, the miscellaneous event handling process, once applied on the miscellaneous bucket, uses one or more miscellaneous knowledge dictionaries for performing the named entity identification of the one or more pre-processed unlabelled entries present in the miscellaneous bucket. The miscellaneous bucket comprises the one or more pre-processed unlabelled entries whose data type is defined as miscellaneous.

At step 414 of the present disclosure, the one or more hardware processors 204 of the system 102 perform a final label identification for each pre-processed unlabelled entry present in each data bucket based on the primary label identified for the respective pre-processed unlabelled entry using a heuristic handler. In an embodiment, the heuristic handler may use one or more knowledge dictionaries and the primary label to identify a final label for each pre-processed unlabelled entry present in each data bucket. The final label is a label which is the closest to the actual data i.e., the unlabelled entry.

So, the heuristic handler uses the one or more knowledge dictionaries that are created based on domain knowledge and the selected primary label to come up with the final label for each unlabelled entry present in each data bucket.

At step 416 of the present disclosure, the one or more hardware processors 204 of the system 102 generate a prediction summary based on the final label identified for each pre-processed unlabelled present in each data bucket once the final label identification is performed for each pre-processed unlabelled entry present in each data bucket. The prediction summary comprises label details of each unlabelled entry present in the unlabelled tabular data and a prediction score. In an embodiment, the prediction score is a confidence score for the labels generated for the unlabelled tabular data.

At step 418 of the present disclosure, the one or more hardware processors 204 of the system 102 compares the prediction score with a predefined plateau threshold score. In an embodiment, the predefined plateau threshold score is accessed from the database 208 and is defined based on the domain knowledge.

At step 420 of the present disclosure, the one or more hardware processors 204 of the system 102 prepare an aggregated prediction report based on the comparison. In particular, if the prediction score is found to be greater than or equal to the predefined plateau threshold score, then system 102 considers that the labels identified for the unlabelled tabular data are in acceptable range and hence it comes out of an iterative loop. In an embodiment, the aggregated prediction report comprises a final label for each unlabelled entry present in the unlabelled tabular data present in the received document.

In an embodiment, in case the prediction score is found to be less than the predefined plateau threshold score, the system 102 may again go back to the preprocessing step i.e., the step 406. And again, all the steps coming after step 406 are performed in an iterative manner till the prediction score crosses or become equivalent to the predefined plateau threshold score.

Figure 5A:
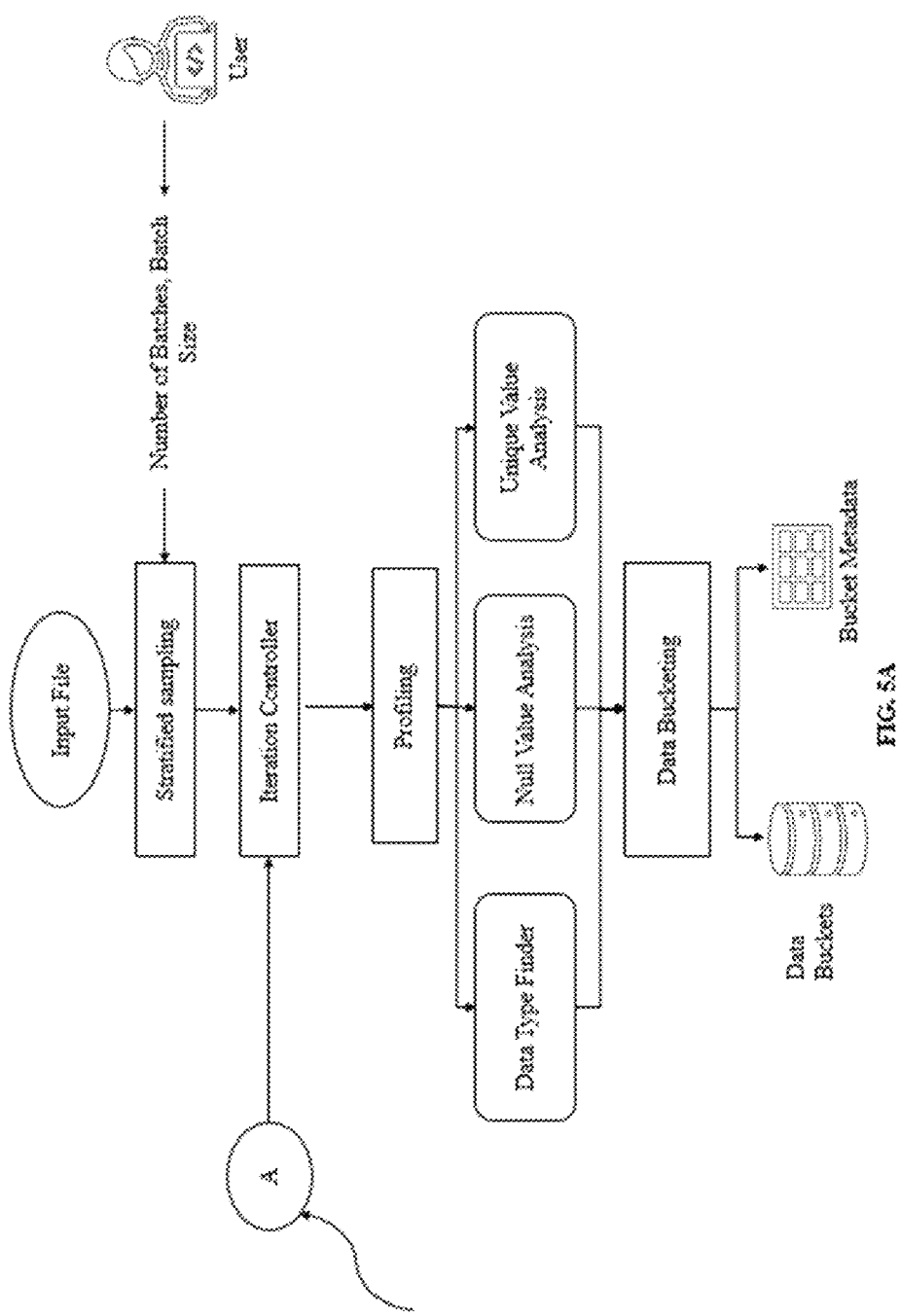
FIGS. 5A and 5B, collectively, illustrate a schematic representation of modules used by the system of FIGS. 1 and 2 for identifying labels of the unlabelled tabular data, in accordance with an embodiment of the present disclosure.
Figure 5B:
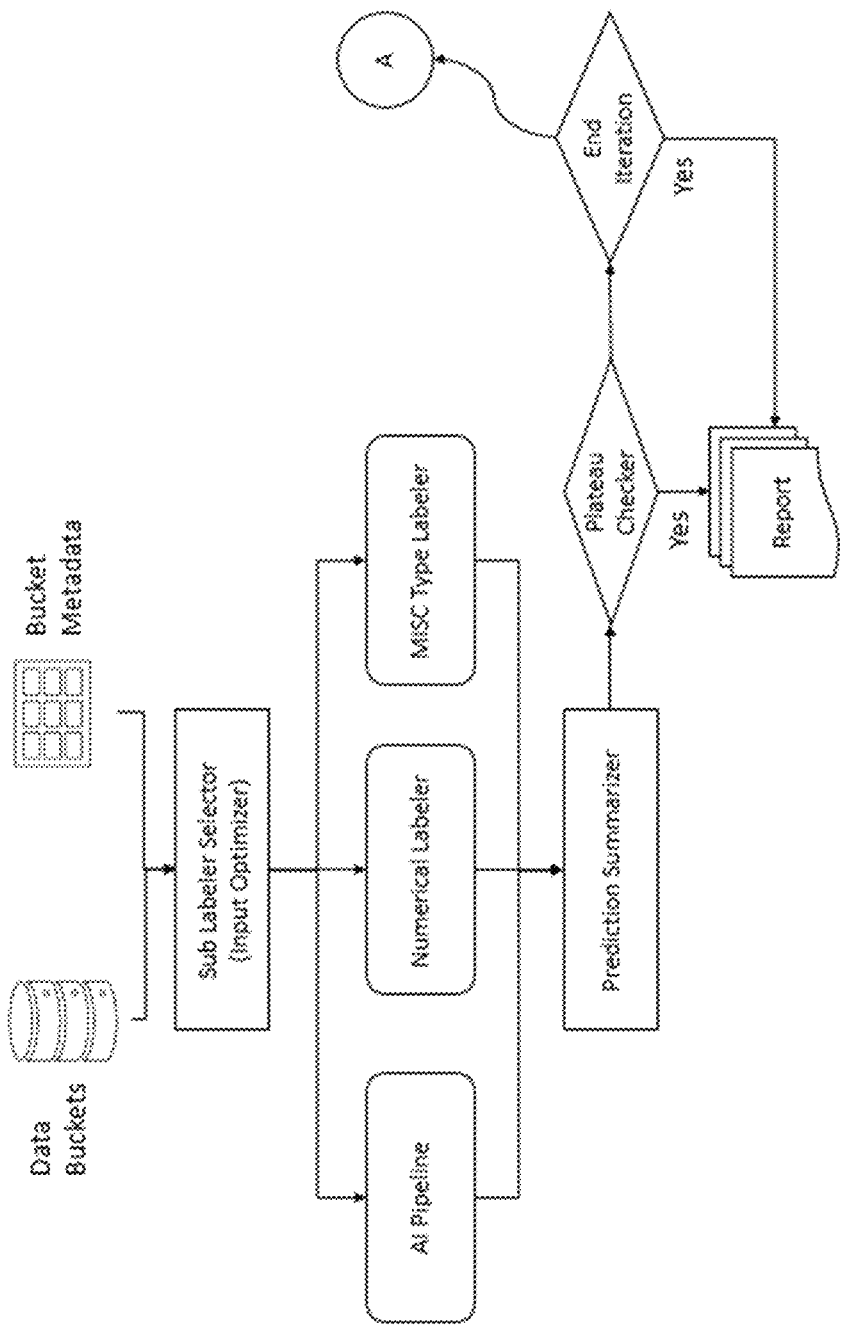

FIGS. 5A and 5B, collectively, illustrate a schematic representation depicting flow of modules used by the system 102 of FIGS. 1 and 2 for identifying labels of unlabelled tabular data, in accordance with an embodiment of the present disclosure.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, one of the most critical problems faced by the industries today is the unavailability of the correctly labelled data. In particular, most of the tabular data that is available for training purposes is without column information. Available techniques have used some semi supervised models for identifying labels for unlabelled data. However, they require large amount of sample label data for training purposes. Further, if sample training data labels is having some issues, then it reflects on the overall data which ultimately results in inaccuracy in training as well as in the classification. So, to overcome the disadvantages, embodiments of the present disclosure provide a method and a system for identifying labels of the unlabelled column data. More specifically, the system and the method predict the primary labels for unlabelled data present in each bucket using AI model based on the metadata and then uses the heuristic handler that further refines the labels based on domain relevant information, thus ensuring improved accuracy of the predicted labels as both AI and domain knowledge is used to come up with the final labels. Further, the system provides an option of providing feedback that may help in continuously enriching the model knowledge in operational domain which may further incrementally increase the prediction accuracy and thus ensuring the increased model maturity.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving, by a labelling system via one or more hardware processors, a document comprising unlabelled tabular data and data segregation details, wherein the unlabelled tabular data comprises a plurality of unlabelled entries, and wherein the segregation details comprises one or more of a batch size and a number of batches to be created;
performing, by the labelling system via the one or more hardware processors, sampling of the unlabelled tabular data to obtain one or more data samples based on the batch size and the number of batches to be created, using a stratified sampling technique, wherein each data sample of the one or more data samples comprises one or more unlabelled entries of the plurality of unlabelled entries;
performing, for each data sample of the one or more data samples:
pre-processing, by the labelling system via the one or more hardware processors, the one or more unlabelled entries present in the data sample to obtain one or more pre-processed unlabelled entries, using one or more pre-processing techniques, wherein the one or more pre-processing techniques comprise a null value analysis, a unique value analysis, and a data type analysis, wherein each pre-processed unlabelled entry comprises a bucket information of a respective unlabelled entry, wherein the bucket information comprises details of an assigned data bucket among one or more data buckets, and wherein the one or more data buckets comprises a text bucket, a numerical bucket, and a miscellaneous bucket;
performing, by the labelling system via the one or more hardware processors, bucketing of each pre-processed unlabelled entry of the one or more pre-processed unlabelled entries present in each data sample based on the bucket information of a respective pre-processed unlabelled entry;
identifying, by the labelling system via the one or more hardware processors, a process among one or more processes to be performed on each data bucket of the one or more data buckets, based on a bucket metadata of a respective data bucket using a label selector, wherein the bucket metadata is accessed from a database;
performing, by the labelling system via the one or more hardware processors, a named entity identification for each pre-processed unlabelled entry present in each data bucket to obtain a primary label for the respective pre-processed unlabelled entry using the process identified for the respective data bucket;
performing, by the labelling system via the one or more hardware processors, a final label identification for each pre-processed unlabelled entry present in each data bucket based on the primary label identified for the respective pre-processed unlabelled entry using a heuristic handler, wherein the heuristic handler uses one or more knowledge dictionaries and the primary label to identify a final label for each pre-processed unlabelled present in each data bucket;
generating, by the labelling system via the one or more hardware processors, a prediction summary based on the final label identified for each pre-processed unlabelled present in each data bucket, wherein the prediction summary comprises label details of each unlabelled entry present in the unlabelled tabular data and a prediction score;
comparing, by the labelling system via the one or more hardware processors, the prediction score with a pre-defined plateau threshold score; and
preparing, by the labelling system via the one or more hardware processors, an aggregated prediction report based on the comparison, wherein the aggregated prediction report comprises a final label for each unlabelled entry present in the unlabelled tabular data present in the received document.

2. The processor implemented method of claim 1, wherein the one or more processes comprises an artificial intelligence (AI) model handling process, a numeric handling process, and a miscellaneous event handling process.

3. The processor implemented method of claim 2, wherein the AI model handling process uses one or more models for performing the named entity identification of the one or more pre-processed unlabelled entries present in the text bucket, and wherein the one or more models comprises a large language model (LLM), a pattern identification model, and a domain specific model.

4. The processor implemented method of claim 2, wherein the numeric handling process uses a numerical ontology model for performing the named entity identification of the one or more pre-processed unlabelled entries present in the numerical bucket, and wherein the numerical bucket comprises the one or more pre-processed unlabelled entries whose data type is defined as numerical.

5. The processor implemented method of claim 2, wherein the miscellaneous event handling process uses one or more miscellaneous knowledge dictionaries for performing the named entity identification of the one or more pre-processed unlabelled entries present in the miscellaneous bucket, and wherein the miscellaneous bucket comprises the one or more pre-processed unlabelled entries whose data type is defined as miscellaneous.

6. The processor implemented method of claim 1, comprising:
creating, by the labelling system via the one or more hardware processors, the bucket metadata for each data bucket based on the pre-processing, after categorizing the plurality of unlabelled entries into the one or more data buckets, wherein the bucket metadata comprises one or more data types, one or more unique values, one or more distinct values and null percentage; and
storing, by the labelling system via the one or more hardware processors, the bucket metadata for each data bucket into the database.

7. A labelling system, comprising:
a memory storing instructions;
one or more communication interfaces; and
one or more hardware processors coupled to the memory via the one or more communication interfaces, wherein the one or more hardware processors are configured by the instructions to:

receive a document comprising unlabelled tabular data and data segregation details, wherein the unlabelled tabular data comprises a plurality of unlabelled entries, and wherein the segregation details comprises one or more of a batch size and a number of batches to be created;

perform sampling of the unlabelled tabular data to obtain one or more data samples based on the batch size and the number of batches to be created using a stratified sampling technique, wherein each data sample of the one or more data samples comprises one or more unlabelled entries of the plurality of unlabelled entries;

perform, for each data sample of the one or more data samples:
- pre-processing, by the labelling system via the one or more hardware processors, the one or more unlabelled entries present in the data sample to obtain one or more pre-processed unlabelled entries, using one or more pre-processing techniques, wherein the one or more pre-processing techniques comprise a null value analysis, a unique value analysis, and a data type analysis, wherein each pre-processed unlabelled entry comprises a bucket information of a respective unlabelled entry, wherein the bucket information comprises details of an assigned data bucket among one or more data buckets, and wherein the one or more data buckets comprises a text bucket, a numerical bucket and a miscellaneous bucket;
- perform bucketing of each pre-processed unlabelled entry of the one or more pre-processed unlabelled entries present in each data sample based on the bucket information of a respective pre-processed unlabelled entry;
- identify a process among one or more processes to be performed on each data bucket of the one or more data buckets, based on a bucket metadata of a respective data bucket using a label selector, wherein the bucket metadata is accessed from a database;
- perform a named entity identification for each pre-processed unlabelled entry present in each data bucket to obtain a primary label for the respective pre-processed unlabelled entry using the process identified for the respective data bucket;
- perform a final label identification for each pre-processed unlabelled entry present in each data bucket based on the primary label identified for the respective pre-processed unlabelled entry using a heuristic handler, wherein the heuristic handler uses one or more knowledge dictionaries and the primary label to identify a final label for each pre-processed unlabelled present in each data bucket;
- generate a prediction summary based on the final label identified for each pre-processed unlabelled present in each data bucket, wherein the prediction summary comprises label details of each unlabelled entry present in the unlabelled tabular data and a prediction score;
- compare the prediction score with a predefined plateau threshold score; and
- prepare an aggregated prediction report based on the comparison, wherein the aggregated prediction report comprises a final label for each unlabelled entry present in the unlabelled tabular data present in the received document.

8. The labelling system of claim 7, wherein the one or more processes comprises an artificial intelligence (AI) model handling process, a numeric handling process and a miscellaneous event handling process.

9. The labelling system of claim 8, wherein the AI model handling process uses one or more models for performing the named entity identification of the one or more pre-processed unlabelled entries present in the text bucket, and wherein the one or more models comprises a large language model (LLM), a pattern identification model and a domain specific model.

10. The labelling system of claim 8, wherein the numeric handling process uses a numerical ontology model for performing the named entity identification of the one or more pre-processed unlabelled entries present in the numerical bucket, and wherein the numerical bucket comprises the one or more pre-processed unlabelled entries whose data type is defined as numerical.

11. The labelling system of claim 8, wherein the miscellaneous event handling process uses one or more miscellaneous knowledge dictionaries for performing the named entity identification of the one or more pre-processed unlabelled entries present in the miscellaneous bucket, and wherein the miscellaneous bucket comprises the one or more pre-processed unlabelled entries whose data type is defined as miscellaneous.

12. The labelling system of claim 7, wherein the one or more hardware processors are configured by the instructions to:
- create the bucket metadata for each data bucket based on the pre-processing, after categorizing the plurality of unlabelled entries into the one or more data buckets, wherein the bucket metadata comprises one or more data types, one or more unique values, one or more distinct values and null percentage; and
- store the bucket metadata for each data bucket into the database.

13. One or more non-transitory machine-readable information storage mediums comprising one or more instructions which when executed by one or more hardware processors cause:
- receiving, by a labelling system, a document comprising unlabelled tabular data and data segregation details, wherein the unlabelled tabular data comprises a plurality of unlabelled entries, and wherein the segregation details comprises one or more of a batch size and a number of batches to be created;
- performing, by the labelling system, sampling of the unlabelled tabular data to obtain one or more data samples based on the batch size and the number of batches to be created, using a stratified sampling technique, wherein each data sample of the one or more data samples comprises one or more unlabelled entries of the plurality of unlabelled entries;
- performing, for each data sample of the one or more data samples:
  - pre-processing, by the labelling system, the one or more unlabelled entries present in the data sample to obtain one or more pre-processed unlabelled entries, using one or more pre-processing techniques, wherein the one or more pre-processing techniques comprise a null value analysis, a unique value analysis, and a data type analysis, wherein each pre-processed unlabelled entry comprises a bucket information of a respective unlabelled entry, wherein the bucket information comprises details of an assigned data bucket among one or more data buckets, and wherein the one or more data buckets comprises a text bucket, a numerical bucket, and a miscellaneous bucket;

performing, by the labelling system, bucketing of each pre-processed unlabelled entry of the one or more pre-processed unlabelled entries present in each data sample based on the bucket information of a respective pre-processed unlabelled entry;

identifying, by the labelling system, a process among one or more processes to be performed on each data bucket of the one or more data buckets, based on a bucket metadata of a respective data bucket using a label selector, wherein the bucket metadata is accessed from a database;

performing, by the labelling system, a named entity identification for each pre-processed unlabelled entry present in each data bucket to obtain a primary label for the respective pre-processed unlabelled entry using the process identified for the respective data bucket;

performing, by the labelling system, a final label identification for each pre-processed unlabelled entry present in each data bucket based on the primary label identified for the respective pre-processed unlabelled entry using a heuristic handler, wherein the heuristic handler uses one or more knowledge dictionaries and the primary label to identify a final label for each pre-processed unlabelled present in each data bucket;

generating, by the labelling system, a prediction summary based on the final label identified for each pre-processed unlabelled present in each data bucket, wherein the prediction summary comprises label details of each unlabelled entry present in the unlabelled tabular data and a prediction score;

comparing, by the labelling system, the prediction score with a predefined plateau threshold score; and preparing, by the labelling system, an aggregated prediction report based on the comparison, wherein the aggregated prediction report comprises a final label for each unlabelled entry present in the unlabelled tabular data present in the received document.

14. The one or more non-transitory machine-readable information storage mediums of claim 13, wherein the one or more processes comprises an artificial intelligence (AI) model handling process, a numeric handling process, and a miscellaneous event handling process.

15. The one or more non-transitory machine-readable information storage mediums of claim 14, wherein the AI model handling process uses one or more models for performing the named entity identification of the one or more pre-processed unlabelled entries present in the text bucket, and wherein the one or more models comprises a large language model (LLM), a pattern identification model, and a domain specific model.

16. The one or more non-transitory machine-readable information storage mediums of claim 14, wherein the numeric handling process uses a numerical ontology model for performing the named entity identification of the one or more pre-processed unlabelled entries present in the numerical bucket, and wherein the numerical bucket comprises the one or more pre-processed unlabelled entries whose data type is defined as numerical.

17. The one or more non-transitory machine-readable information storage mediums of claim 14, wherein the miscellaneous event handling process uses one or more miscellaneous knowledge dictionaries for performing the named entity identification of the one or more pre-processed unlabelled entries present in the miscellaneous bucket, and wherein the miscellaneous bucket comprises the one or more pre-processed unlabelled entries whose data type is defined as miscellaneous.

18. The one or more non-transitory machine-readable information storage mediums of claim 13, wherein the one or more instructions which when executed by the one or more hardware processors further cause: creating, by the labelling system, the bucket metadata for each data bucket based on the pre-processing, after categorizing the plurality of unlabelled entries into the one or more data buckets, wherein the bucket metadata comprises one or more data types, one or more unique values, one or more distinct values and null percentage; and storing, by the labelling system, the bucket metadata for each data bucket into the database.

* * * * *